United States Patent
Suiter et al.

(10) Patent No.: US 9,015,647 B2
(45) Date of Patent: Apr. 21, 2015

(54) DYNAMIC PRINTED CIRCUIT BOARD DESIGN REUSE

(71) Applicant: Mentor Graphics Corporation, Wilsonville, OR (US)

(72) Inventors: Gerald Suiter, Madison, AL (US); Henry Potts, Collins, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/149,564

(22) Filed: Jan. 7, 2014

(65) Prior Publication Data

US 2014/0123098 A1 May 1, 2014

Related U.S. Application Data

(63) Continuation of application No. 12/814,247, filed on Jun. 11, 2010, now abandoned.

(60) Provisional application No. 61/186,095, filed on Jun. 11, 2009.

(51) Int. Cl.
*G06F 17/50* (2006.01)

(52) U.S. Cl.
CPC ........ *G06F 17/5068* (2013.01); *G06F 2217/04* (2013.01)

(58) Field of Classification Search
CPC ............ G06F 17/5068; G06F 17/5027; G06F 17/5072; G06F 2217/04; G01R 31/2818; H05K 1/029; H05K 1/0298; H05K 2201/10212; H05K 2201/10689; H05K 3/222; H05K 3/429
USPC .................................................. 716/136–139
See application file for complete search history.

(56) References Cited

U.S. PATENT DOCUMENTS

| | | | |
|---|---|---|---|
| 2004/0029383 A1 | 2/2004 | Tanaka et al. | |
| 2006/0129955 A1* | 6/2006 | Jacobsen et al. | 716/4 |
| 2008/0148208 A1* | 6/2008 | Jacobsen et al. | 716/8 |

* cited by examiner

*Primary Examiner* — Binh Tat
(74) *Attorney, Agent, or Firm* — Venable LLP

(57) ABSTRACT

Techniques for enabling the dynamic reuse of printed circuit board designs are provided. A master printed circuit board design comprising a plurality of modular flexible designs is received. Additionally, a target design that includes ones of the plurality of flexible designs is identified. Subsequently, as the master design, or ones of the plurality of flexible designs within the master design, are modified, the target design is correspondingly modified. With some implementations, the master design is housed within a library. The library may be used to implement versioning capability for the flexible designs. With further implementations, the master design may itself be a target design.

17 Claims, 6 Drawing Sheets

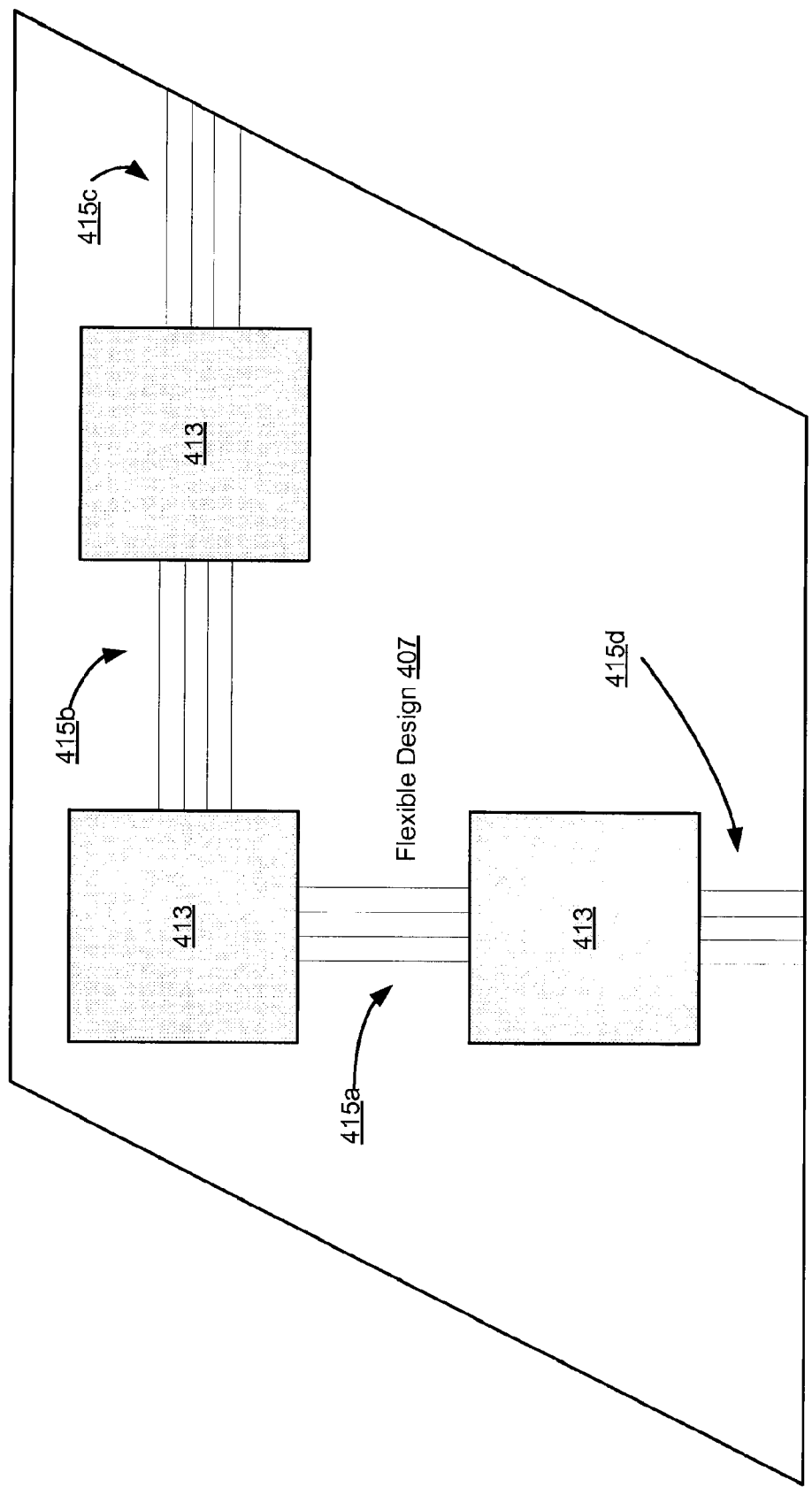

DYNAMIC PRINTED CIRCUIT BOARD DESIGN REUSE

REFERENCE TO RELATED APPLICATIONS

This application claims priority under 35 U.S.C. §119(e) to U.S. Provisional Patent Application No. 61/186,095, entitled "Reusable Circuits for Dynamic Printed Circuit Board Design," filed on Jun. 11, 2009, and naming Gerald Suiter et al. as inventors, which application is incorporated entirely herein by reference.

FIELD OF THE INVENTION

The invention relates to the field of computer programs and computer program products. In particular, various implementations of the invention provide processes, machines, and manufactures that facilitate the dynamic reusability of printed circuit board designs.

BACKGROUND OF THE INVENTION

Integrated circuit devices are used in a wide variety of modem appliances, such as computers, automobiles, telephones, televisions, manufacturing tools, satellites and even toys. While even a small integrated circuit device can provide a great deal of functionality, almost every integrated circuit device must be electrically connected to an input or output device, to another integrated circuit device, or to some other electronic component in order to be useful. To provide these electrical connections, integrated circuit devices are typically mounted on a printed circuit board (PCB). Most printed circuit boards have a rigid, planar core. The core may be formed, for example, of a sheet of fiberglass material impregnated with epoxy. Conductive lines or "traces" then are formed on one or both surfaces of the core, to electronically connect the components attached to the printed circuit board.

There are a number of steps performed in the design of a printed circuit board, often referred to as the "design flow." An illustrative design flow may include an initial step where a designer creates a schematic diagram for the system to be connected through the printed circuit board. This process includes identifying each component that will be included in the system. A system can include "active" components, such as field programmable gate array (FPGA) integrated circuits or application-specific integrated circuits (ASICs). A system also can include "passive" components, such as, resistors, capacitors, and inductors. In addition to identifying each component, the schematic design will represent the electrical connections that must be formed between each component.

Subsequently, a designer typically will verify the functionality of the system described in the schematic design. The design may, for example, use software modeling tools to ensure that the system described in the schematic will reliably perform the desired operations. If any errors are detected, then the schematic design may be corrected to address the errors, and the functional verification process repeated.

Once the schematic design is finalized, the designer will typically create a physical design to implement the schematic design. This physical design is sometimes referred to as the layout design. The designer will begin by selecting a physical location in the layout design for each component. When a location for a component has been selected, the designer may add a component object, representing that component, to that location in the layout design. The component object may include a variety of information regarding the physical component it represents, such as the configuration of the connection pins used to electrically connect that component to other components. With an integrated circuit device, for example, the substrate with the integrated circuit will be encased in a package for protection from the environment. The connection pins serve to provide an electrical connection, through the packaging, to the electrical contacts of the integrated circuit.

After the component objects for the various components are located in the layout design, the designer then will route traces in the layout design to connect the components as specified in the schematic design. Trace routing may be accomplished by hand in some cases. Alternatively, computer implemented design tools may route traces in an automatic fashion or in a semi-automatic fashion.

As circuit designs continually increase in complexity, correspondingly, printed circuit board designs increase in complexity to match the complexity of the circuit design. Furthermore, circuit designs continually decrease in dimension and include an ever increasing number of components whose physical size continues to shrink. As a result, printed circuit board designs are vastly more complex today than yesterday. This has necessitated that "teams" of designers work on the same printed circuit board design. However, this presents a new difficulty in that design reuse and simultaneous modification of designs is problematic where multiple designers are working on the same design, often simultaneously.

BRIEF SUMMARY OF THE INVENTION

The invention provides methods and apparatuses that facilitate the dynamic reuse of printed circuit board designs. In some implementations, a master printed circuit board design comprising a plurality of flexible designs is received. Additionally, a target design that includes ones of the plurality of flexible designs is identified. Subsequently, as the master design, or ones of the plurality of flexible designs within the master design, is modified, the target design is correspondingly modified.

With some implementations, the master design is housed within a library. The library may be used to implement versioning capability for the flexible designs. With further implementations, the master design may itself be a target design.

These and other features and aspects of the invention will be apparent upon consideration of the following detailed description of illustrative embodiments.

BRIEF DESCRIPTION OF THE DRAWINGS

The present invention will be described by way of illustrative embodiments shown in the accompanying drawings in which like references denote similar elements, and in which:

FIG. 4C shows an illustrative flexible circuit; and

DETAILED DESCRIPTION OF ILLUSTRATIVE EMBODIMENTS

Illustrative Computing Environment

Various examples of dynamic printed circuit board design reuse methods and tools according to embodiments of the invention may be implemented by one or more programmable computing devices executing computer-executable software instructions. Alternately or additionally, various examples of dynamic printed circuit board design reuse methods and tools according to embodiments of the invention may be implemented by computer-executable software instructions stored in a computer-readable medium, such as a magnetic or optical storage device, or a solid state memory storage device. As these examples of the invention may be implemented using software instructions, the components and operation of a generic programmable computer system on which various embodiments of the invention may be employed will first be described.

Further, because of the complexity of some electronic design automation processes and the large size of many printed circuit board designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

Figure 1:
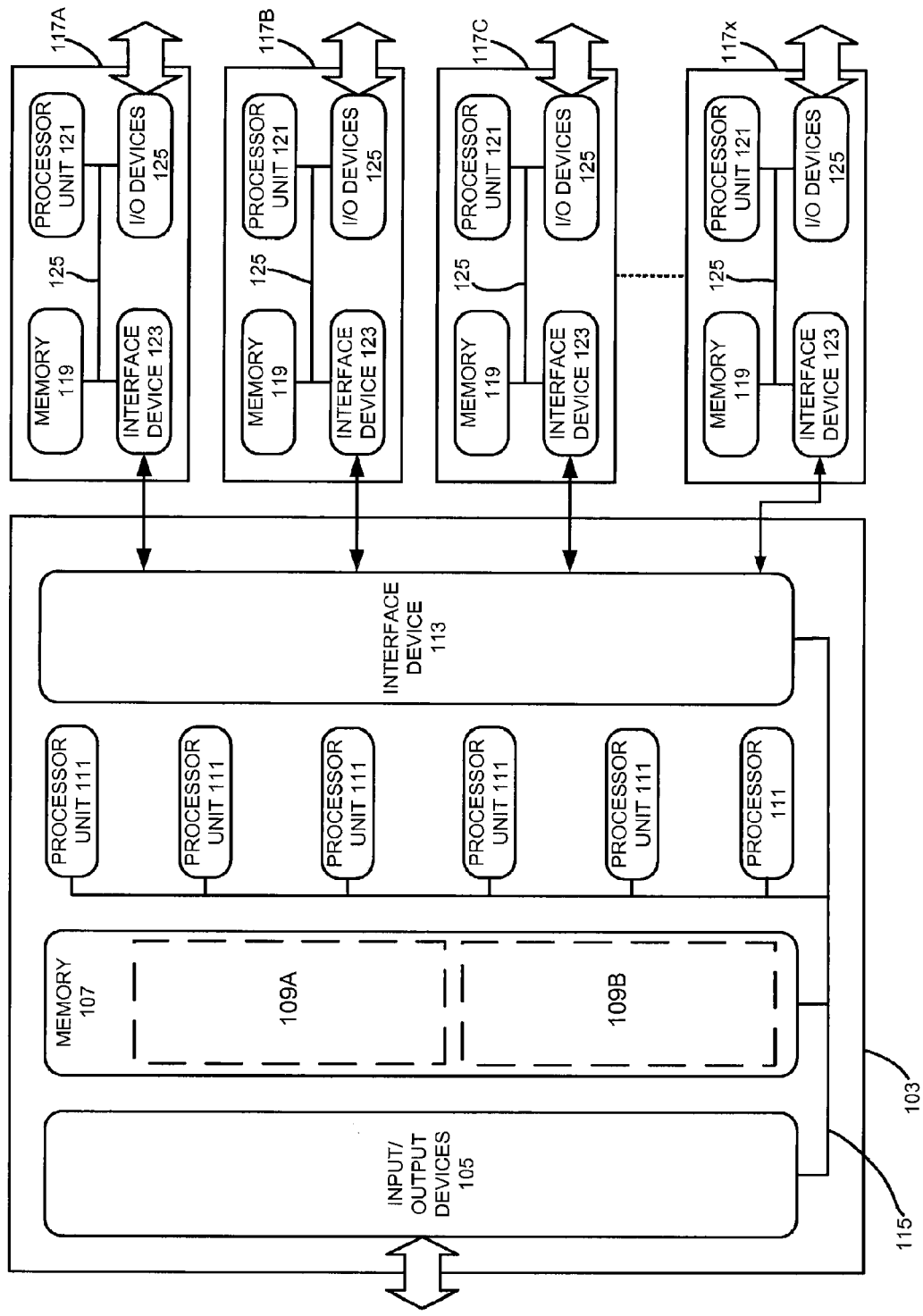
FIG. 1 shows an illustrative computing device that may be employed to implement various examples of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
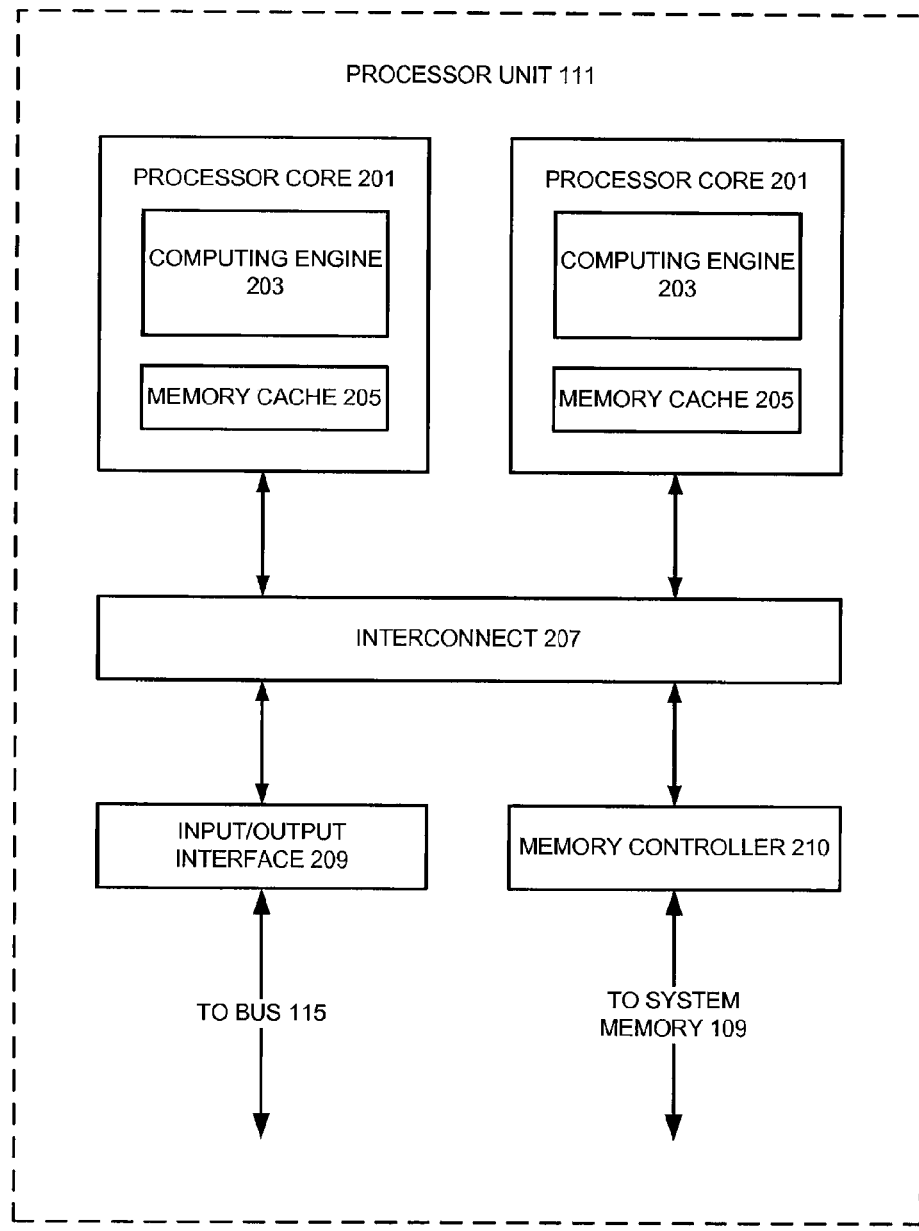
FIG. 2 illustrates the computing device of FIG. 1 in greater detail.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 1157, 117C . . , 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Dynamic Printed Circuit Board Design Reuse Tool and Method

As noted above, various embodiments of the invention may be implemented by the execution of software instructions in conjunction with a programmable computer. For example, some embodiments of the invention may be implemented using the XtremePCB® software tools, including the Xtreme Design Client® and Xtreme Design Session®, available from Mentor Graphics® Corporation of Wilsonville, Oreg.

It should be appreciated, however, that other software tools for identifying and manipulating structures defined in a printed circuit board design are known in the art, and thus may be used to implement various examples of the invention. Further, a user may employ separate software tools in combination to implement various examples of the invention.

Figure 3:
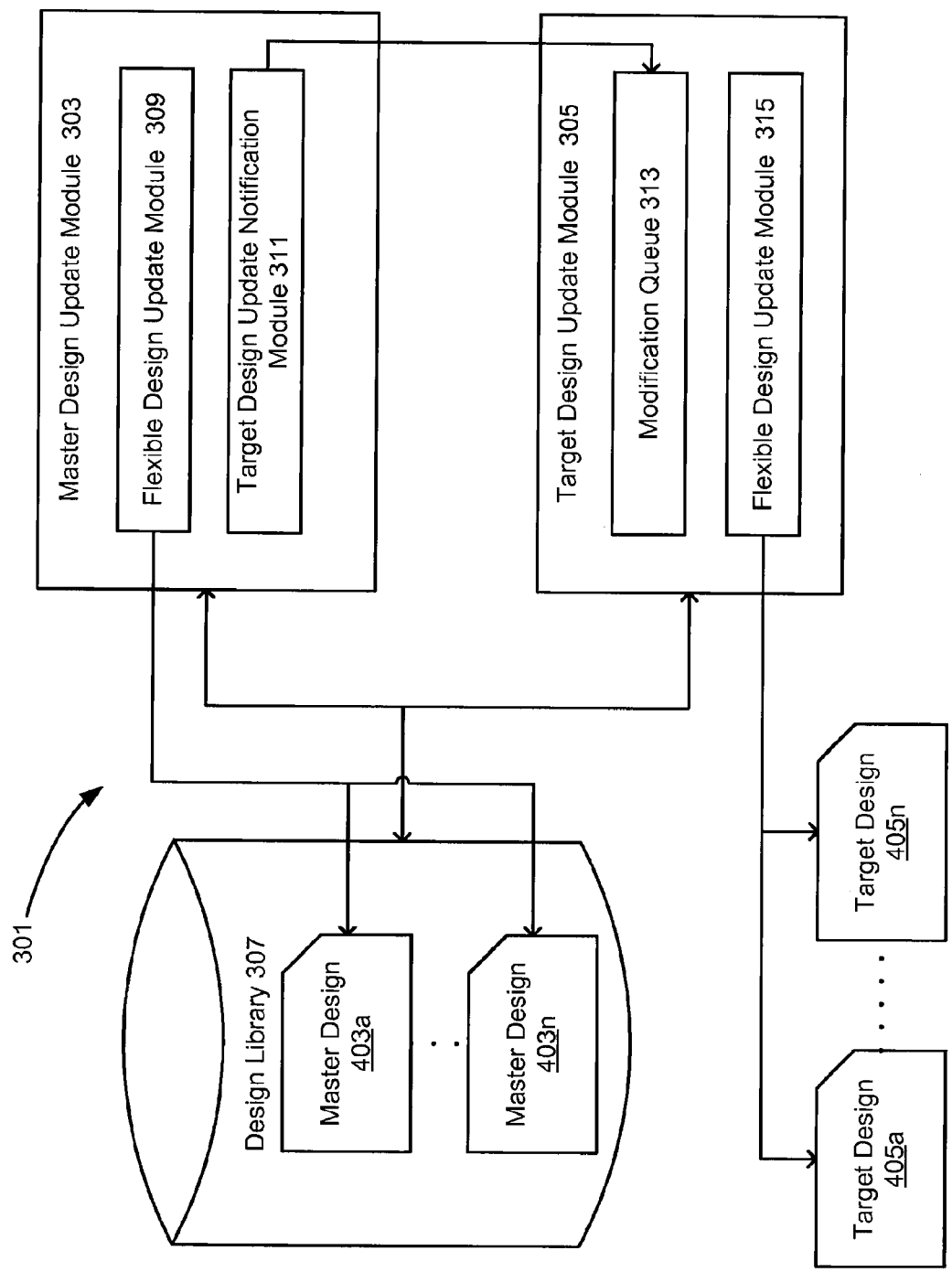
FIG. 3 illustrates a dynamic printed circuit board design reuse tool that may be provided by various implementations of the present invention.

FIG. 3 illustrates a dynamic printed circuit board reuse tool 301 that may be implemented according to various examples of the invention to facilitate design reuse in a printed circuit board design. As can be seen in this figure, the tool 301 includes a master design update module 303, a target design update module 305, and a design library 307. As can be additionally seen from this figure, the design library 307 includes a plurality of master designs 403 and the tool 301 is interconnected to a plurality of target designs 405. The master designs 403 and the target designs 405 will be described by reference to FIGS. 4A, 4B and 4C. Furthermore, the operation of each of the components of the tool 301 will be discussed in more detail below with regard to the method 501 illustrated in FIG. 5.

Initially, at least one master design 403 is provided to the design library 307. With some implementations of the invention, the master design 403 may be provided directly to the library 307, by for example, a user of the tool 301. Alternately, the master design 403 may be deposited into the design library 307 by another electronic design automation tool, such as, for example, a library management program. With various examples of the invention, the master design 403 may be in any desired type of data format, such as Schematic File Format, ASCII Data File, ExpressPCB, or PCB Design File. Furthermore, the master design 403 may describe an entire printed circuit board, or it may describe only a portion of a printed circuit board.

Figure 4B:
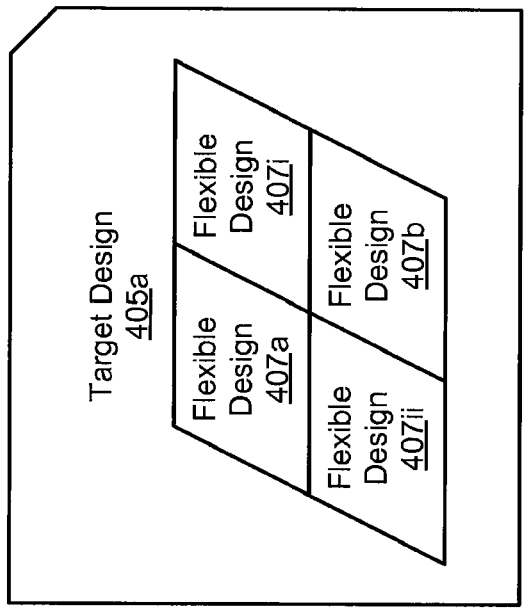
FIG. 4B shows an illustrative target design.
Figure 4A:
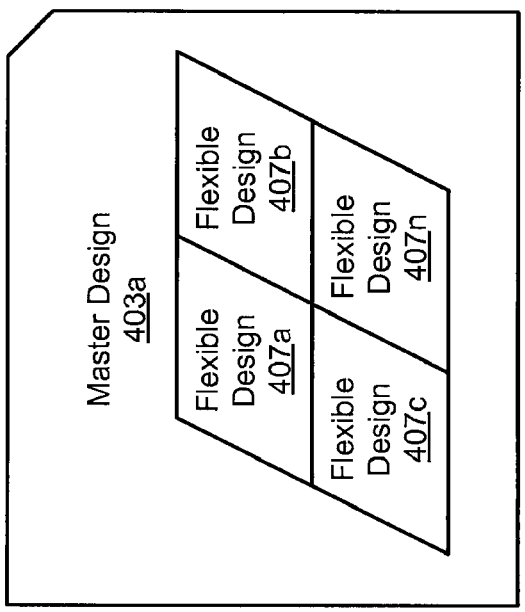
FIG. 4A shows an illustrative master design.

Subsequently, one or more target designs 405 are registered with the tool 301. As can be seen from FIG. 4A, a master design 403 includes a plurality of flexible designs 407. For example, the master design 403a is shown with flexible designs, 407a through 407n. Correspondingly, a target design 405, as shown in FIG. 4B, also includes a plurality of flexible designs 407. However, a target design 405 may include one or more combinations of flexible designs 407 from one or more master designs 403. For example, the target design 405a is shown comprising the flexible designs 407a and 407b, which corresponds to the master design 403a, as well as a flexible design 407i and 407ii, whose master design 405 is not shown here. In various implementations, a target design 405 may include flexible designs 407 that do not correspond to a master design 403. More particularly, a target design 405 may only partially comprise flexible designs 407 that are updated dynamically by the tool 301. The balance of the target design may include flexible designs 407 designed specifically for that target design 405. In some cases, these specially designed flexible designs 407 are not shared between other target designs 405 or other master designs 403. Furthermore, in some cases, a target design 405 is a partial, as opposed to a complete, design for a printed circuit board.

As used herein, a flexible design 407 includes both a logical component 413 and a physical component 415, as illustrated in FIG. 4C. The logical components 413 represent components, both passive and active, included in the flexible design 407. The physical components 415 represent traces or physical connections between the logical components 413. As can be seen, the physical components include both internally facing (e.g. 415a and 415b) and externally facing (e.g. 415c and 415d) traces. The externally facing physical components 415 are used to make electrical connections between the different flexible designs 407 within each master design 403 or target design 405. By structuring flexible components 407 in this way, a printed circuit board design may be constructed by combining different flexible components 407 in a similar fashion to how a puzzle is put together.

Figure 5:
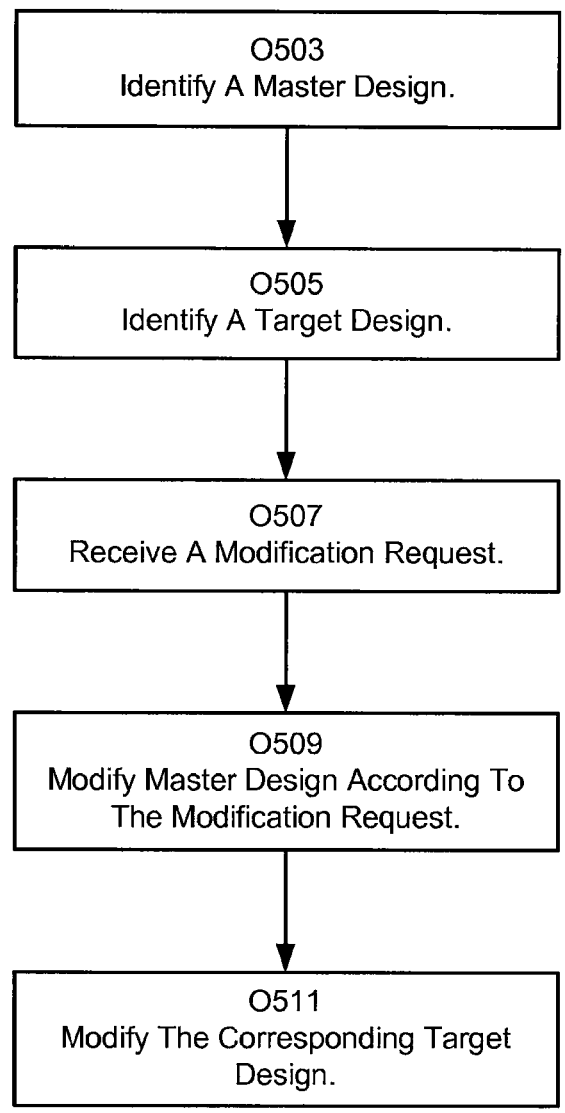
FIG. 5 illustrates a method of dynamic printed circuit board design reuse.

Referring now to FIG. 5, as can be seen, the method 501 includes an operation 503 for identifying a master design 403 and an operation 505 for identifying a target design 505. In various implementations of the invention, the operation 503 and/or the operation 505 may identify more than one master design 403 or target design 405. With some implementations, as described above, a design (e.g. the master design 403 or the target design 405) is provided to the tool 301 by a user of the tool. With alternative implementations, the tool 301 identifies the library 307 and any master designs 403 housed therein.

The method 501 further includes an operation 507 for receiving a modification request corresponding to a master design 403. In various implementations, the modification request specifies that a flexible design update module 309 replace a one of the flexible designs 407 within the master design 403 with an alternate, modified, flexible design 407. The replacement may be initiated manually by a user of the tool 301. Alternatively, the replacement may be accomplished by a user of the tool 301 first placing the modified flexible circuit 407 into a repository where subsequently, the modification request may be authorized by the tool 301, alternatively or additionally, the modification request may be authorized by a user of the tool having some authorization permissions, such as, for example, a user tasked with maintaining the design library 307. In various implementations, a flexible design 407 may be marked for release, such as, for example, by calling the design "golden." A modification request corresponding to a golden design may require authorization prior to being replaced by the flexible design update module 309, as described above. With some implementations, a modification request may be generated by a printed circuit board editing tool. For example, this tool may generate the modification request as a result of a user of the tool making changes to the master design 403 via the tools interface.

Subsequent to receiving the modification request, and in some cases, authorization of the modification request, the flexible design update module 309 replaces the flexible design 407 with the modified flexible design 407. As can be seen, the method 501 includes an operation 509 for modifying the master design according to the modification request. Alternatively, the operation 509 may correspond to the flexible design update module making the requisite changes specified in the modification request to the flexible design 407. The master design update module 303 further includes a target design update notification module 311. In various implementations of the invention, the target design update notification module 311 identifies when a flexible design 407 corresponding to one or more target designs 405 has be modified, and subsequently notifies the target design update module 305 that corresponding modifications are necessary in the target designs 405. These corresponding modifications are recorded in a modification queue 313 within the target update module 305. As can be seen, the target design update module 305 additionally includes a flexible design update module 315, which implements the necessary modifications, such as, for example, replacing flexible designs 407. In various implementations, the target design update notification module 311 is implemented in a dedicated computing device to facilitate rapid updating of the target designs.

With some implementations of the invention, a master design 403 and a target design 405 having flexible designs 407 in common may both be under "active modification" simultaneously. As a result, as modifications are being carried out on the master design 403 by the flexible design update module 309, and these modifications are being communicated to the modification queue 313, the flexible design update module 315 may simultaneously make the modifications to the target design 405. As can be seen, this corresponds to an operation 511 of the method 501 for modifying the corresponding target design. As a result of these actions, the target design 405 may be updated simultaneously or "in-real-time" with the master design 403. In some cases, modification requests may be generated by a printed circuit board design tool being operated by a first design engineer while editing the master design 403, and these modifications will "appear" or be represented in another instance of the printed circuit board design tool being operated by a second design engineer to edit the target design 405.

In various implementations, the target design 405 and master design 403 are not under active edit at the same time. As a result, modifications to the master design 403 carried out while the target design 405 is not under active edit may be represented when the target design 405 is next opened in a design tool.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A method comprising:
identifying, by a computing system, a master printed circuit board design partitioned into multiple flexible circuit designs;
receiving, by the computing system, a proposed change to the master printed circuit board design;
selectively modifying, by the computing system, at least one of the flexible circuit designs in the master printed circuit board design with the proposed change based, at least in part, on a classification of the at least one of the flexible circuit designs as golden or non-golden;
identifying, by the computing system, a target printed circuit board design that includes at least one of the flexible circuit designs modified in the master printed circuit board design; and
modifying, by the computing system, the identified flexible circuit designs in the target printed circuit board design to correspond to the modified flexible circuit designs in the master printed circuit board design.

2. The method recited in claim 1, wherein the multiple flexible circuit designs include: at least one logical component; a plurality of physical components that interconnect the at least one logical component; and a plurality of physical components that provide for the interconnection of one flexible design to another.

3. The method recited in claim 1, wherein
a first subset of the multiple flexible circuit designs are classified as golden designs and a second subset of the multiple of flexible circuit designs are classified as non-golden designs, and the selectively modifying, by the computing system, at least one of the flexible circuit designs comprises:
modifying, by the computing system, one or more of the flexible circuit designs that are non-golden designs according to the modification request;
requesting, by the computing system, authorization to modify one or more of the flexible circuit designs that are golden designs; and
modifying, by the computing system, the one or more of the flexible circuit designs that are golden designs if the requested authorization is received.

4. A method comprising:
identifying, by a computing system, a plurality of flexible printed circuit board designs;
receiving, by the computing system, at least one proposed change to at least one of the plurality of flexible printed circuit board designs;
causing, by the computing system, the at least one proposed change to be reflected in the at least one of the flexible printed circuit board designs, resulting in at least one modified flexible designs;
saving, by the computing system, the at least one modified flexible designs to a memory storage location;
identifying, by the computing system, a target printed circuit board design that includes at least one of the at least one flexible printed circuit board designs that has been modified; and
causing, by the computing system, the target printed circuit board design to be updated to correspond to the at least one at least one modified flexible designs,
wherein a first subset of the plurality of flexible printed circuit board designs are classified as golden designs and a second subset of the plurality of flexible printed circuit board designs are classified as non-golden designs, and the method act of causing the at least one proposed change to be reflected in the at least one of the flexible printed circuit board designs comprises:
modifying, by the computing system, the one or more flexible printed circuit board designs that are non-golden designs according to the modification request;
requesting, by the computing system, authorization to modify the one or more flexible printed circuit board designs that are golden designs; and
modifying, by the computing system, the one or more flexible printed circuit board designs that are golden designs if the requested authorization is received.

5. The method recited in claim 4, wherein the method act of causing, by the computing system, the target printed circuit board design to be updated to correspond to the at least one of the one or more flexible designs comprises: detecting when the target printed circuit board design is active; and replacing the flexible printed circuit board design within the target printed circuit board design with the modified flexible design once the target printed circuit board design is active.

6. The method recited in claim 4, the method act of receiving, by the computing system, at least one proposed change to a one or more of the plurality of flexible printed circuit board designs comprising receiving one or more proposed changes to a target printed circuit board design, the target printed circuit board design comprising at least one of the plurality of flexible printed circuit board designs, and at least one of the one or more proposed changes corresponding to the at least one flexible printed circuit board designs.

7. The computer implemented method recited in claim 4, wherein the plurality of flexible printed circuit board designs include: at least one logical component; a plurality of physical components that interconnect the at least one logical component; and a plurality of physical components that provide for the interconnection of one flexible design to another.

8. One or more non-transitory computer readable storage medium, having computer executable structions comprising:
identifying, by a computing system, a master printed circuit board design partitioned into multiple flexible printed circuit board designs;
receiving, by the computing system, a proposed change to the master printed circuit board design;
selectively modifying, by the computing system, at least one of the flexible printed circuit board designs in the master printed circuit board design with the proposed change based, at least in part, on a classification of the at least one of the flexible printed circuit board designs as golden or non-golden;
identifying, by the computing system, a target printed circuit board design that includes at least one of the flexible printed circuit board designs modified in the master printed circuit board design; and
modifying, by the computing system, the identified flexible printed circuit board designs in the target printed circuit board design to correspond to the modified flexible designs in the master printed circuit board design.

9. The one or more non-transitory computer readable storage medium recited in claim 8, wherein the operation for modifying the identified flexible printed circuit board designs in the target printed circuit board design comprises: detecting when the target printed circuit board design is active; and replacing the flexible printed circuit board design within the target printed circuit board design with the modified flexible design once the target printed circuit board design is active.

10. The one or more non-transitory computer readable storage medium recited in claim 8, the operation for receiving a proposed change to the master printed circuit board design comprising receiving one or more proposed changes to a target printed circuit board design, the target printed circuit board design comprising at least one of the plurality of flexible printed circuit board designs, and at least one of the one or more proposed changes corresponding to the at least one flexible printed circuit board designs.

11. The one or more non-transitory computer readable storage medium recited in claim 8, wherein the multiple flexible printed circuit board designs include: at least one logical component; a plurality of physical components that interconnect the at least one logical component; and a plurality of physical components that provide for the interconnection of one flexible design to another.

12. The one or more non-transitory computer readable storage medium recited in claim 8, wherein
   a first subset of the multiple flexible printed circuit board designs are classified as golden designs and a second subset of the multiple of flexible printed circuit board designs are classified as non-golden designs, and the selectively modifying, by the computing system, at least one of the flexible printed circuit board designs comprises:
   modifying one or more of the flexible printed circuit board designs that are non-golden designs according to the modification request;
   requesting authorization to modify one or more of the flexible printed circuit board designs that are golden designs; and
   modifying the one or more of the flexible printed circuit board designs that are golden designs if the requested authorization is received.

13. A system adapted to modifying a design for a printed circuit board comprising:
   at least one processor; and
   one or more non-transitory computer readable storage medium bearing a set of software instructions that cause the system to perform a set of tasks, the set of tasks comprising:
   identifying a master printed circuit board design partitioned into multiple flexible printed circuit board designs;
   receiving a proposed change to the master printed circuit board design;
   selectively modifying at least one of the flexible printed circuit board designs in the master printed circuit board design with the proposed change based, at least in part, on a classification of the late least one of the flexible printed circuit board designs as golden or non-golden;
   identifying a target printed circuit board design that includes at least one of the flexible printed circuit board designs modified in the master printed circuit board design; and
   modifying the identified flexible printed circuit board designs in the target printed circuit board design to correspond to the modified flexible designs in the master printed circuit board design.

14. The system recited in claim 13, wherein the task for modifying the identified flexible printed circuit board designs in the target printed circuit board design comprises: detecting when the target printed circuit board design is active; and replacing the flexible printed circuit board design within the target printed circuit board design with the modified flexible design once the target printed circuit board design is active.

15. The system recited in claim 13, the task for receiving a proposed change to the master printed circuit board design comprising receiving one or more proposed changes to a target printed circuit board design, the target printed circuit board design comprising at least one of the plurality of flexible printed circuit board designs, and at least one of the one or more proposed changes corresponding to the at least one flexible printed circuit board designs.

16. The system recited in claim 13, wherein the multiple flexible printed circuit board designs include: at least one logical component; a plurality of physical components that interconnect the at least one logical component; and a plurality of physical components that provide for the interconnection of one flexible design to another.

17. The system recited in claim 13, wherein
   a first subset of the multiple flexible printed circuit board designs are classified as golden designs and a second subset of the multiple of flexible printed circuit board designs are classified as non-golden designs, and the selectively modifying, by the computing system, at least one of the flexible printed circuit board designs comprises:
   modifying one or more of the flexible printed circuit board designs that are non-golden designs according to the modification request;
   requesting authorization to modify one or more of the flexible printed circuit board designs that are golden designs; and
   modifying the one or more of the flexible printed circuit board designs that are golden designs if the requested authorization is received.

* * * * *